(12) United States Patent
Camp

(10) Patent No.: US 8,264,095 B2
(45) Date of Patent: Sep. 11, 2012

(54) ELECTROWAVE

(76) Inventor: William Robert Camp, East Point, GA (US)

( * ) Notice: Subject to any disclaimer, the term of this patent is extended or adjusted under 35 U.S.C. 154(b) by 677 days.

(21) Appl. No.: 12/380,827

(22) Filed: Feb. 25, 2009

(65) Prior Publication Data

US 2010/0026001 A1 Feb. 4, 2010

Related U.S. Application Data

(60) Provisional application No. 61/137,315, filed on Jul. 30, 2008.

(51) Int. Cl.
*F03B 13/12* (2006.01)
*F03B 13/00* (2006.01)

(52) U.S. Cl. ................. 290/53; 290/42; 290/54

(58) Field of Classification Search .............. 290/42, 290/52, 53; 417/333, 334; 60/398, 503
See application file for complete search history.

(56) References Cited

U.S. PATENT DOCUMENTS

| | | | |
|---|---|---|---|
| 4,160,624 A | 7/1979 | Smith | |
| 4,204,406 A | 5/1980 | Hopfe | |
| 4,281,257 A | 7/1981 | Testa | |
| 5,049,004 A * | 9/1991 | Niimura | 405/204 |
| 5,405,250 A * | 4/1995 | Vowles et al. | 417/331 |
| 2002/0067043 A1* | 6/2002 | Ovadia | 290/53 |
| 2007/0130929 A1* | 6/2007 | Khan et al. | 60/398 |
| 2008/0190105 A1* | 8/2008 | Tai et al. | 60/498 |

\* cited by examiner

*Primary Examiner* — Quyen Leung
*Assistant Examiner* — Jose Gonzalez Quinones
(74) *Attorney, Agent, or Firm* — Harry I. Leon; Vivian L. Steadman

(57) ABSTRACT

A machine which capitalizes on the descent of water which has been elevated by making use of the random use of waves and or the velocity of the waters.

A device which determines the true surface level in spite of random motions of the waters such as waves, surges and etc. by establishing the theory that water seeks its own level.

A device which capitalizes on the velocity and weight of water, such as is present in waves and river waters, wherein the current has sufficient velocity to depress a ramp and produce useful energy.

30 Claims, 16 Drawing Sheets

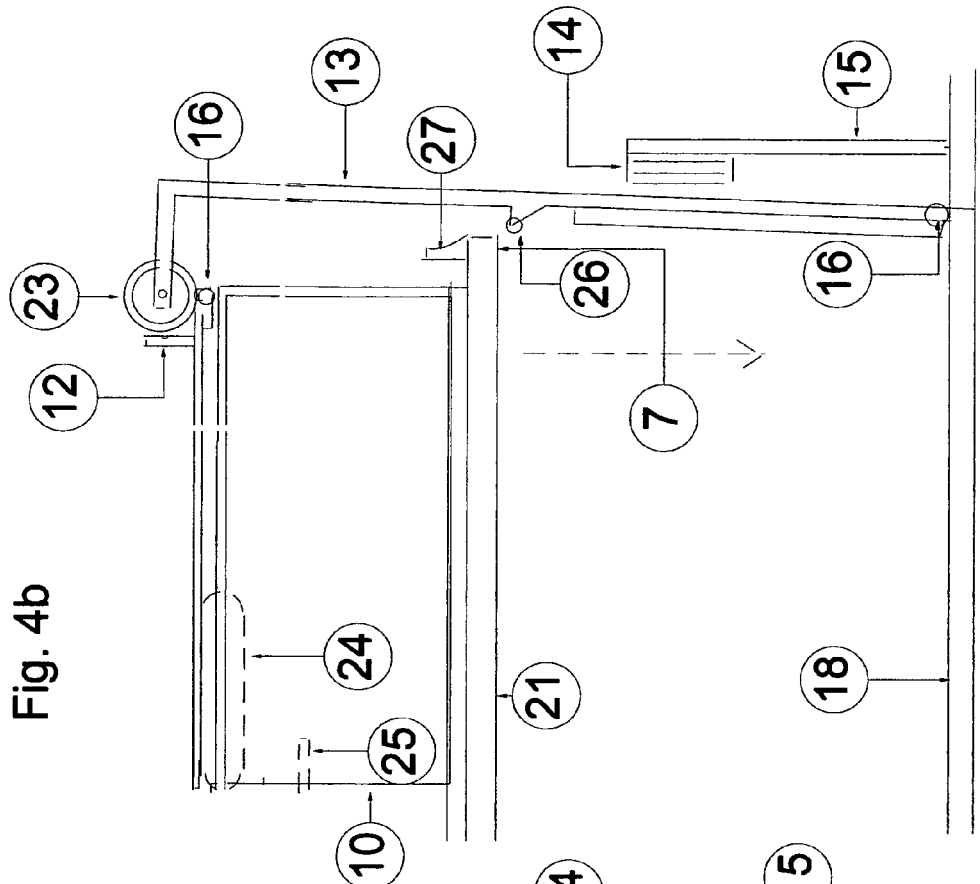
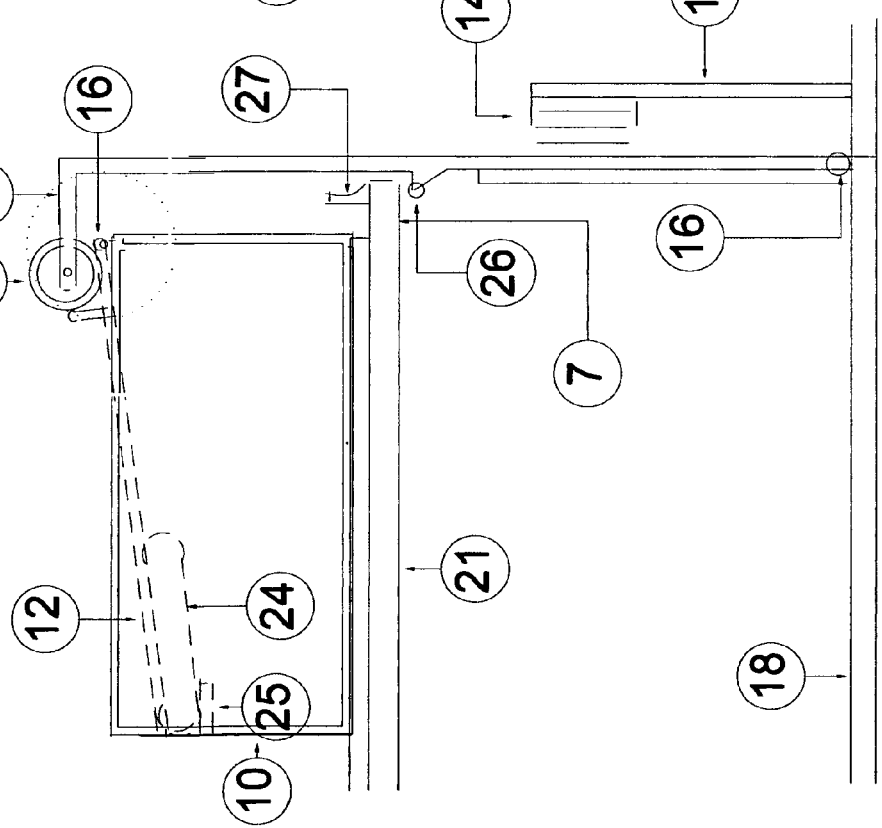
Fig. 4b
Fig. 4a

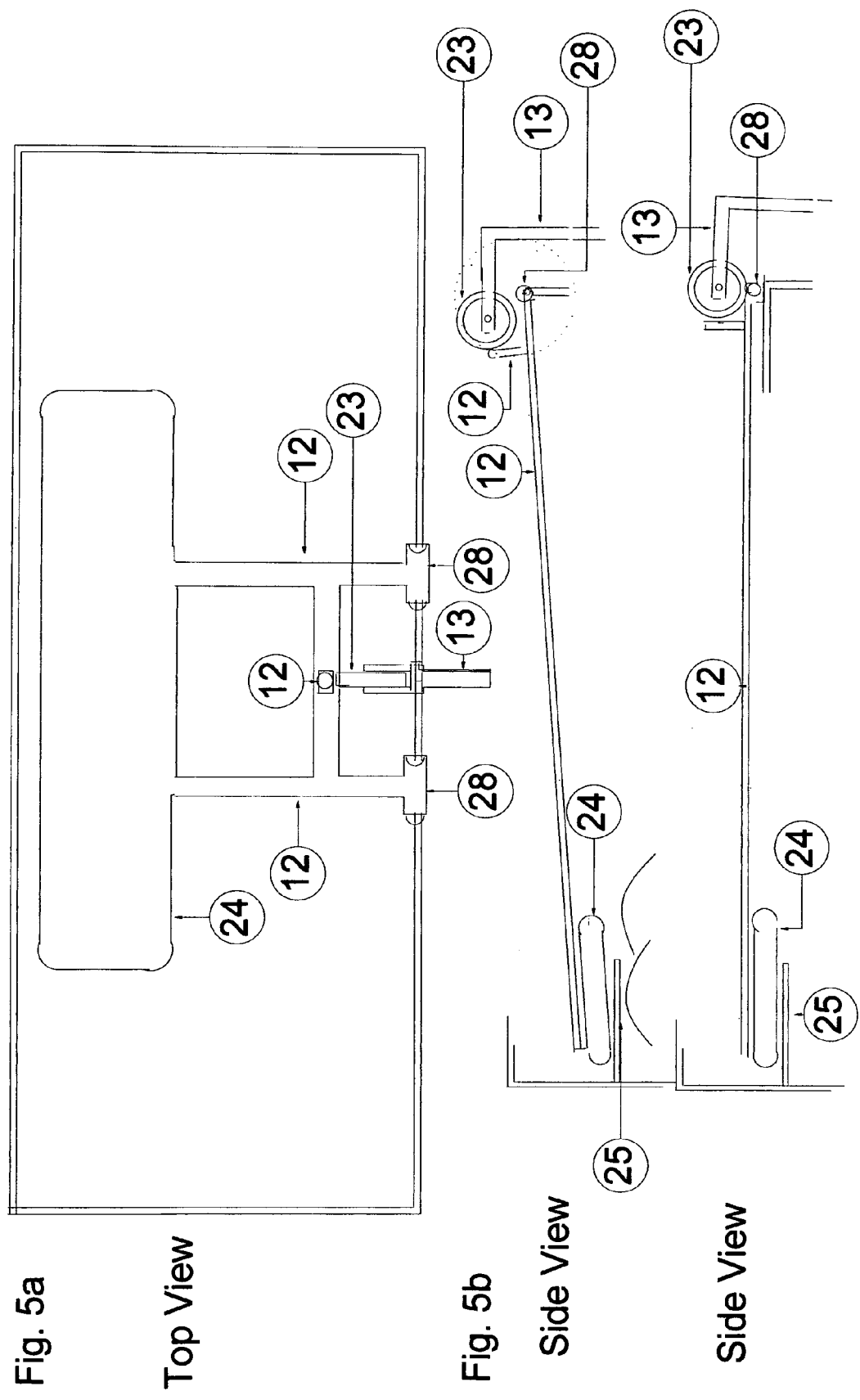

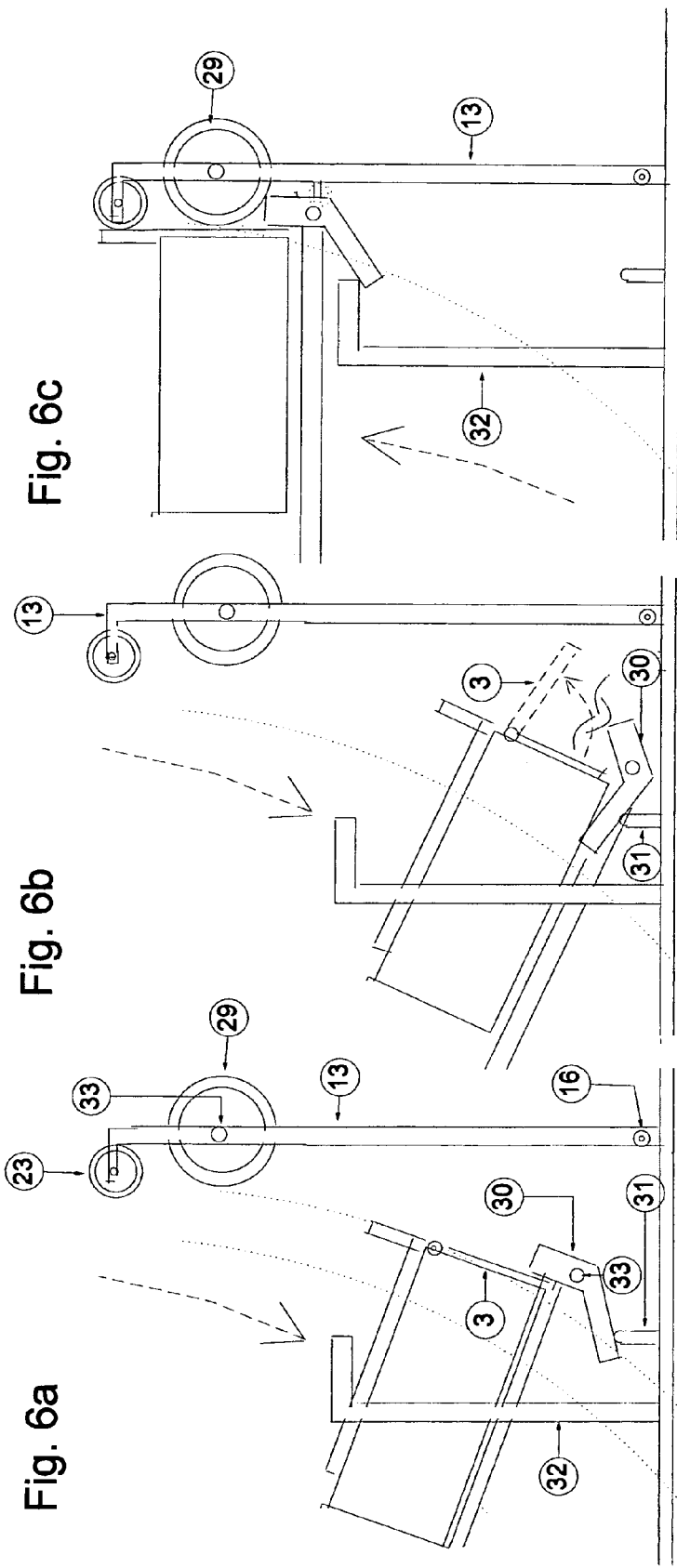

Fig. 8 Side View

Front View

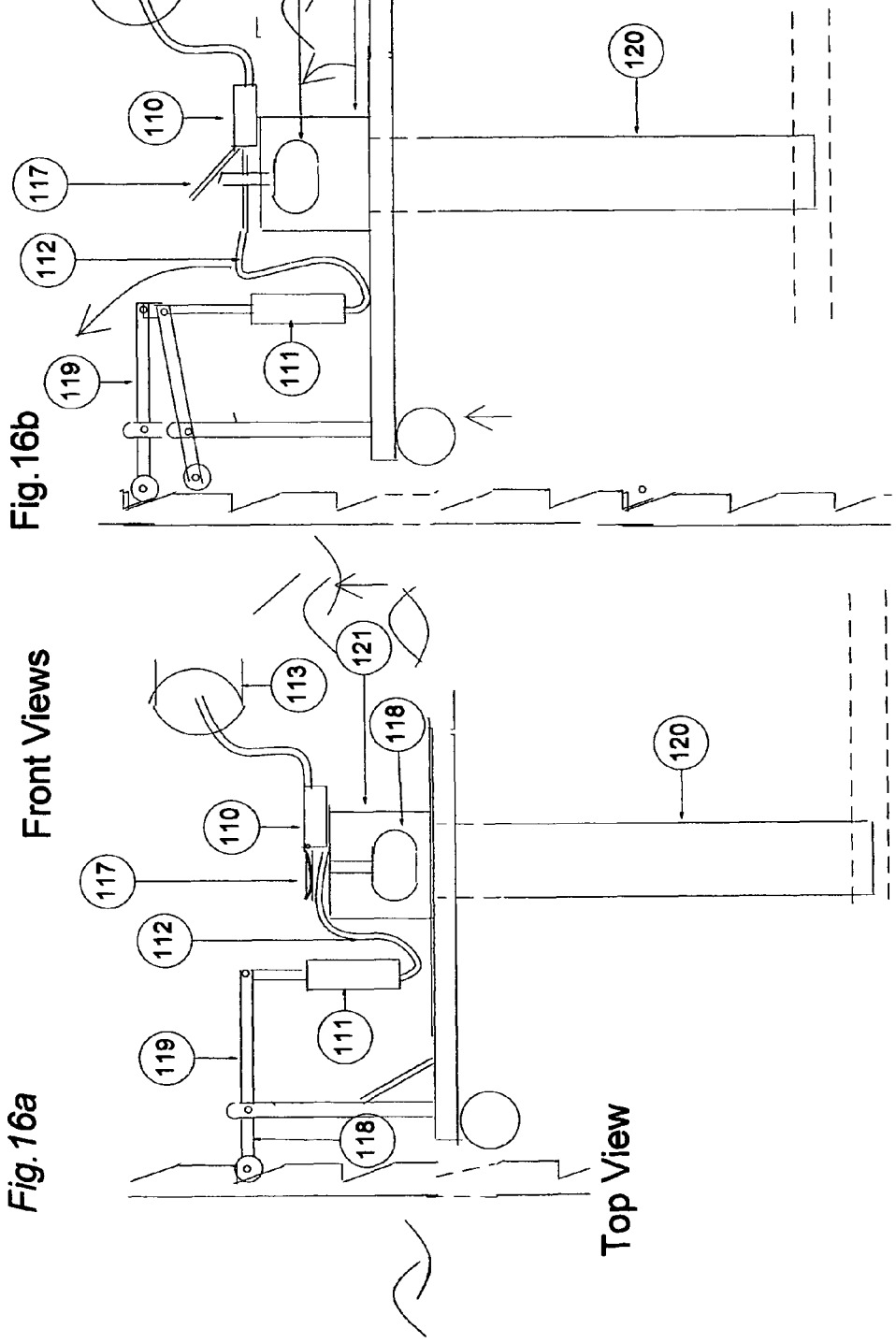

ELECTROWAVE

This application claims priority to U.S. Provisional patent application No. 61/137,315. Filed Jul. 30, 2008 entitled WAVE CATCHER. Conformation #8917

BACKGROUND

This device (ELECTROWAVE) makes use or the speed, motion and weight of wave waters to produce a steady and uninterrupted supply of electricity. It uses a base which is well anchored to the ocean floor so that the devise is maintained in a secure position except for upward and downward motion. The devise is maintained at levels corresponding to the levels of the rising and falling tides by a devise which will be referred to as a "Surface Finder." Maintaining a constant positioning of the ElectroWave enable it to better capitalize on the random motions of the surf. Also the devise is constructed primarily of plastics, fiberglass and other materials that can better withstand the caustic effects of ocean water.

SUMMARY OF THE INVENTION

As a wave moves up and forward it is ushered up a ramp and into a bucket-like structure. As the water moves up the ramp it presses the ramp downward and proceeds onward to fill the bucket-like structure (which will be referred to as the bucket). When the bucket has been filled with water a float that is located in the upper area of the bucket moves upward moving a lever which causes a snap which holds the bucket up to be released. The bucket then plunges downward. When the bucket arrives at the lower level one or more of the walls of the bucket and or the floor of the bucket is opened by releasing a snap which holds the walls and or the floor of the bucked in a closed position. The water then gushes out of the bucket. Weights which are located on the opposite end of the fulcrum then cause the bucket to rise once again to the uppermost position. The ramp is also located on a fulcrum with weights on the opposite end that return it to the uppermost position after it has been depressed. Also compressed air cylinders are located on the opposite ends of both fulcrums. They are attached to a lower base. The rods of the pistons are attached to an upper frame which moves them up and down in response to the upward and downward motions of the bucket and ramp. The air is then compressed by the compressed air cylinders and transferred to compressed air tanks. The air is then transferred to a compressed air motor which turns an electric generator producing an electric current The ElectroWave device is maneuvered to match the changing surface levels by rolling upward and downward on two tracts which rise upward from a stationary platform. The platform is submerged but floats toward the surface via floats which are attached to it. It is located at a level that is beneath the level of the lowest ebb tide. The platform is attached to cables which are anchored to an ocean (or lake) floor. Also there is a tract which rises upward between one or both of the dual tracts described above. It has notches on it to which the devise attaches on order to prevent random upward movements that would be caused by the effect of the waves on the floats attached to the lower frame of the device. The tracts rise upward to the highest known level of the highest of the high tides including surges caused by wind.

As the device moves up and down the lower frame is kept on the same level as the surface of the waters by a mechanism called a SURFACE FINDER. This mechanism determines the surface level by using the familiar principle that water seeks it own level. The upward movements of the devise are determined by this surface finder which causes it to lock onto the notches as it moves upward in measured increments.

BRIEF DESCRIPTION OF THE DRAWINGS

FIG. 4a shows a bucket in a locked position. FIG. 4b shows a bucket in an unlocked position ready to descend.

FIG. 5a shows top view of a float and locking mechanism. FIG. 5b side views of FIG. 5a, locked and unlocked.

FIG. 6a shows the bucket in a lower position FIG. 6b shows the bucket in the lowermost position with a snap released so that a door is opened and the water in the bucket is released. FIG. 6c bucket resumes upper position.

FIG. 16a A frontal view of the Surface finder with the latch and wheel locked into a notch when the float is in a downward position.

FIG. 16b A frontal view of Surface Finder where the latch and wheel has been released from the notch so that the device has progressed upward to the notch above, permitting lower base on which it is mounted to rise and accommodate the new surface level.

DETAILED DESCRIPTION

Figure 1:
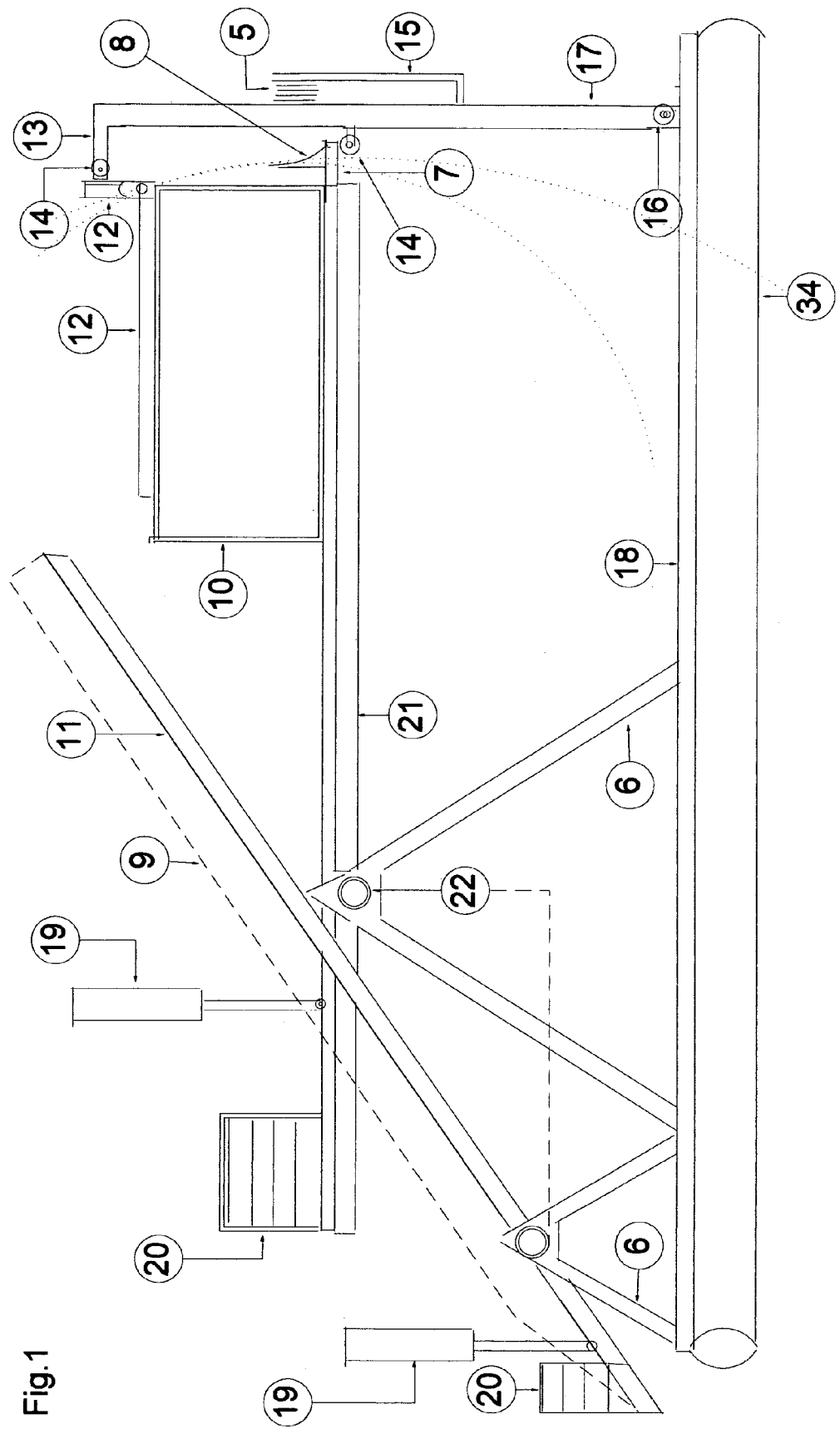
FIG. 1 shows a side view of an electrowave device according to a preferred embodiment

Referring now to FIG. 1 which is a side view of a portion on the ElectroWave device. It demonstrates the following items: a float 34 which is attached to the lower frame 18. An upper frame 21, an axle joint 22 which supports the upper frame 21 and a ramp 11 with sides 9, a bucket 10 is located on the front end of the upper frame 21, on top of the bucket is a rod 12. In front of the box is an emptying mechanism 13-17 it has wheels 14, a flexible support 15 and or a spring 5, and a joint 16 that enables the mechanism to lean forward and backward. There are also supports 6, weights 20 that enable both the ramp and bucket to return to uppermost position after the water is no longer present Eg. the bucket has released its water and there is no water on the ramp. Compressed air cylinders 19 supply compressed air to a main tank 36 shown in FIG. 8. Note that the ramp 11 is shown in its uppermost position.

Figure 2:
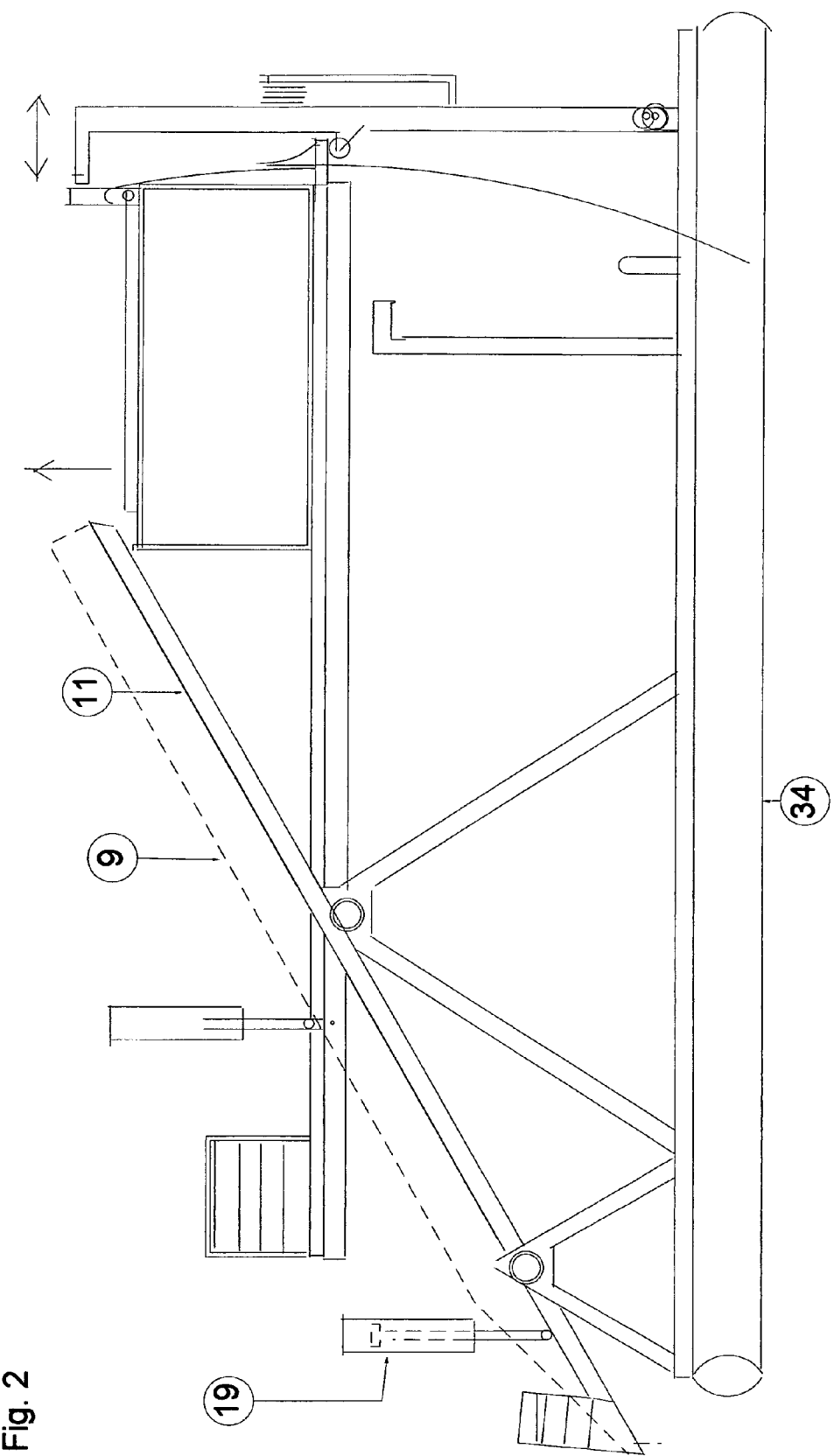
FIG. 2 shows a repeat of FIG. 1 with a ramp in a downward position

Referring to FIG. 2 is the same as FIG. 1 except that the ramp 11 is in a downward position. Not that the rod of the compressed air cylinder 19 has engaged the plunger so as to compress the air in the cylinder.

Figure 3:
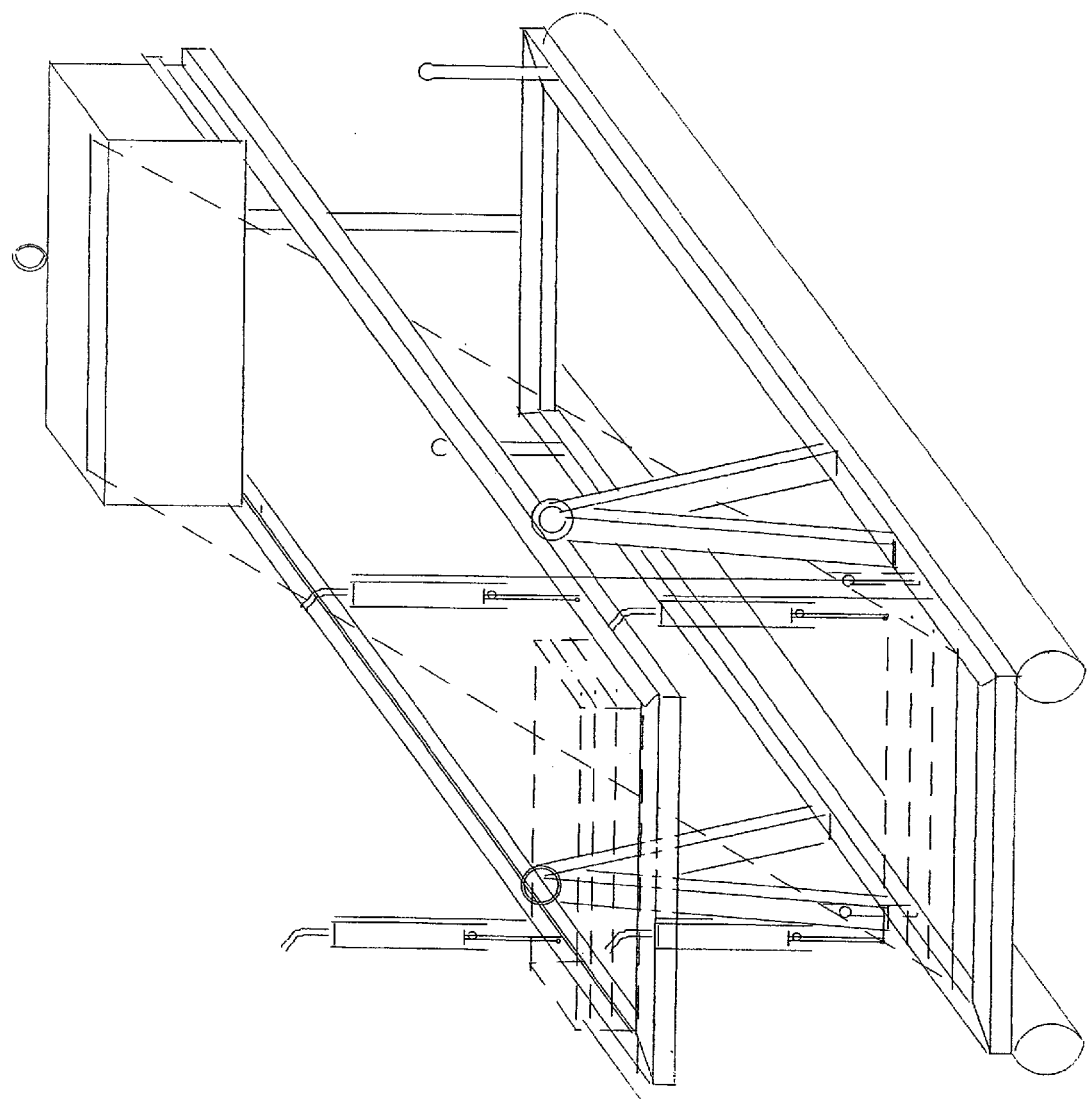
FIG. 3 shows a 3 dimensional view of FIG. 2

Referring to FIG. 3 shows a composite 3-D view for clarification.

FIG. 4a shows a release mechanism which consists of a float 24 attached to a rod 12 with a joint 16. When the bucket is full the float rises and the wheel 23 is moved outward by a rod 12. A support 13 with a joint 16 is pushed outward releasing a snap 7 which enables the bucket to fall downward from the position seen in FIG. 4a. The float 24 rests on ledge 25 when the water in the bucket is at a lower level. The support 13 and joint 16 are attached to the lower frame 18. The bucket 10 rests on the upper frame 21.

FIG. 5a shows a top view of a release mechanism described in FIGS. 4a & 4b. Eg. a float 24 a rod 12, a wheel 23, joints 28 and a support 13. FIG. 5b is a side view.

FIG. 6a shows is a side view of the bucket in descent. A front wall 3 is kept closed by a snap 30. FIG. 6b shows the bucket in final descent. The snap 30 is forced into an open position by a protruding rod 31 attached to the base causing the door 3 to open releasing the water from the bucket. FIG. 6c shows the bucket once again in the uppermost position. A protruding rod 32 forces the snap 30 into a closed position. A wheel 29 insures that the wall 3 is closed prior to snap 32 returning to a locked position.

Figure 7:
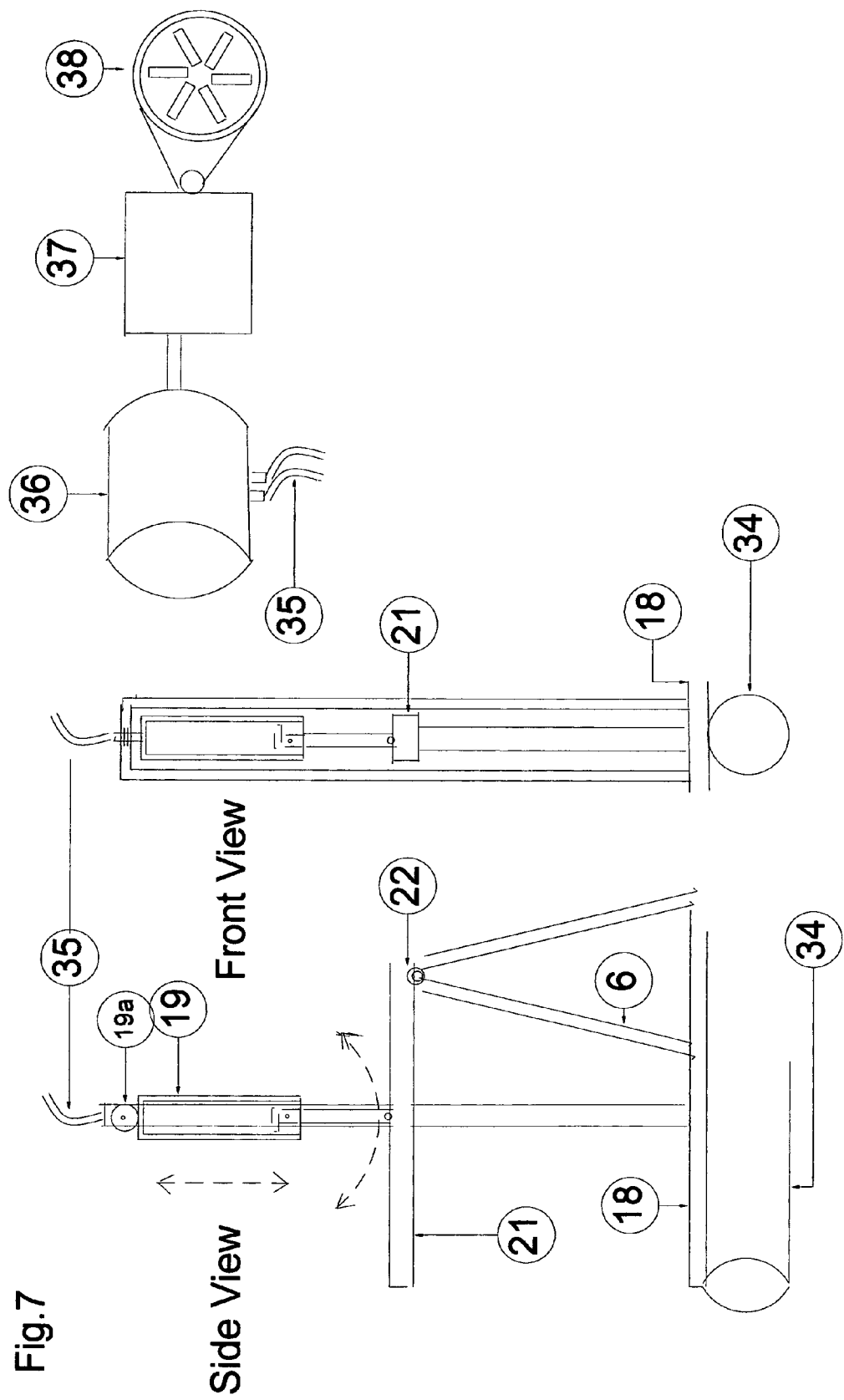
FIG. 7 shows a joint (19c) that permits accommodation between the relative changes of position between the upper and lower frames.

FIG. 7a Shows a side view of a joint 19a that enables the compressed air cylinder 19a swing back and forth in a front to back direction and vice versa. This enables the cylinder to maintain a more vertical position while the upper frame moves up and down moving the rod and plunger of the cylinder up and down. Other items shown are: a tube 35 to transfer air to a compressed air tank, a joint 22 which forms a fulcrum, a support 6, ends of a lower frame 18 and an upper frame 21 and also a float 34. FIG. 7b shows a side view of the mechanism described in FIG. 7a. FIG. 7c demonstrates an air tube 35, a compressed air tank 36. a compressed air motor 37 and an electric generator 38.

Figure 8:
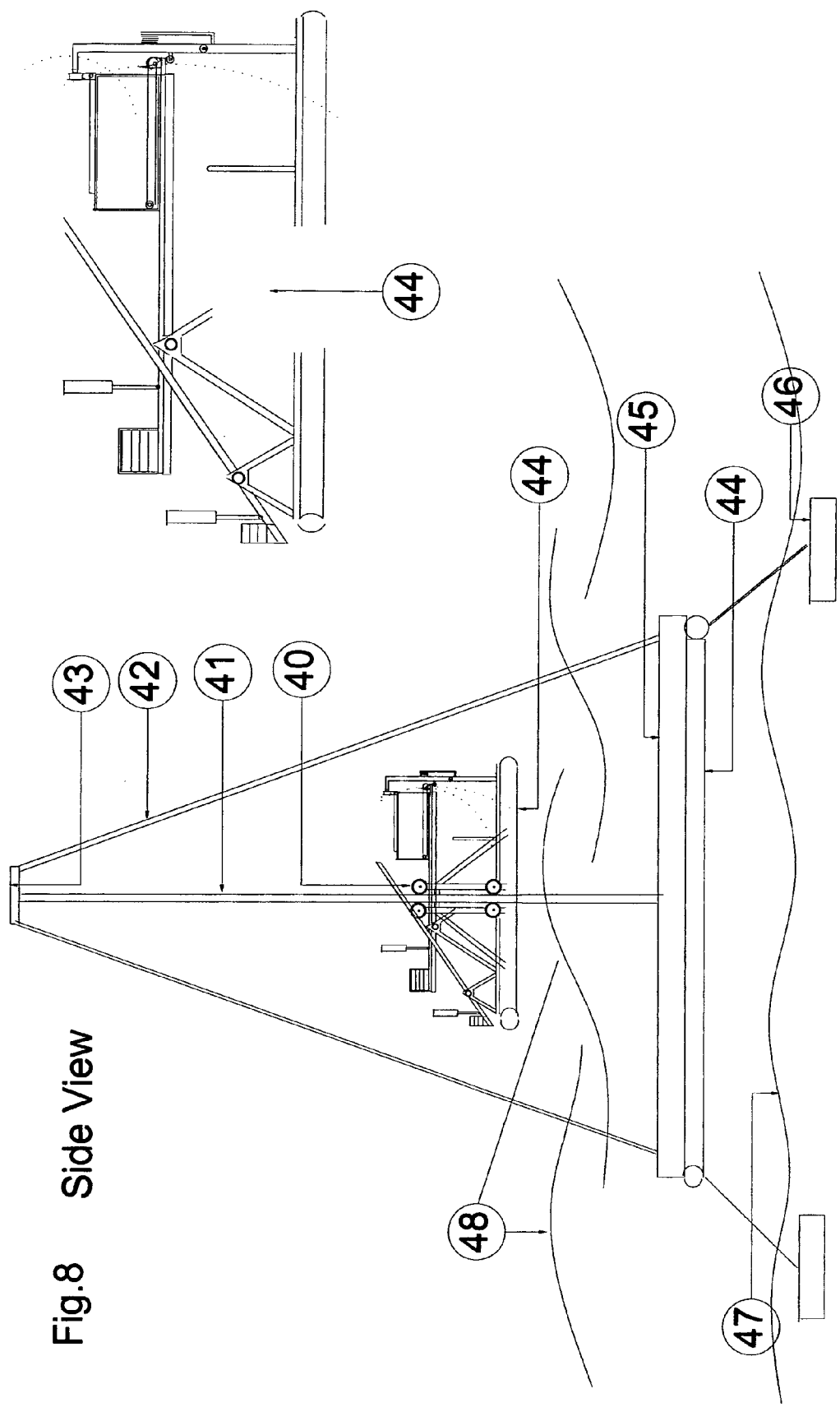
FIG. 8 shows an anchored platform that floats upward toward the surface while remaining submerged. It supports the tracts on which the ElectroWave device rolls up and down and also enables the device to remain on the level of the surface of the tides.

FIG. 8 Shows a composite view for orientation. A base platform 45 is located beneath the surface and waves 48 it has multiple floats on the underside 44 and is attached to cables on the underside which are attached to cement blocks or an or a different type of anchor located on the ocean floor 47 (or a lake floor). Located just above the waves is an ElectroWave device 44. Also there are wheels 40 on which the devise rolls up and down on tracts 41. Cables 42 can be attached from the support on top 43 as needed.

Figure 9:
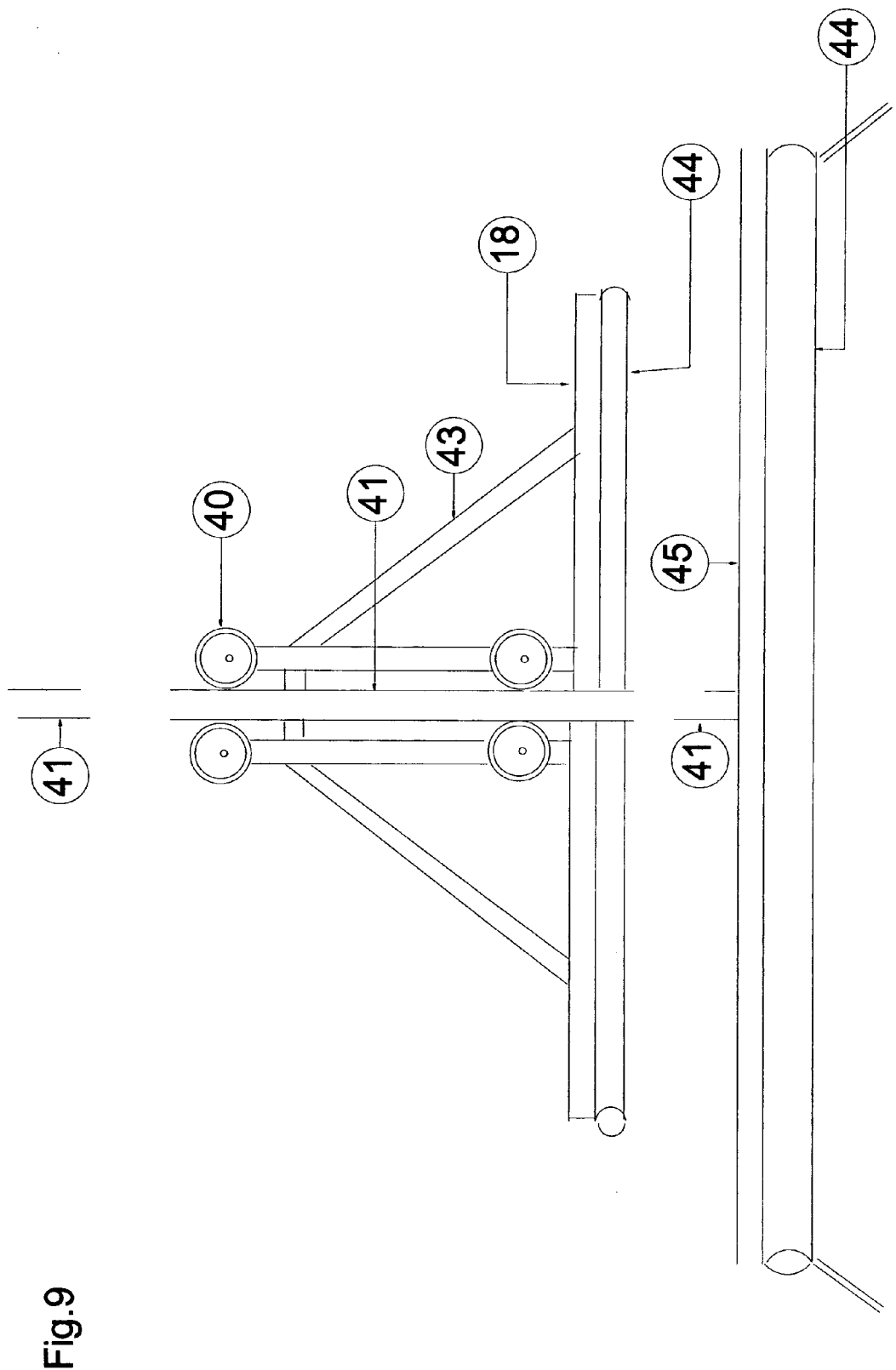
FIG. 9 shows wheels that are mounted on the lower frame. They roll on tracts tracks described in FIG. 8. Also there is a track with notches that are locked into to permit the device to remain at the level of the surface.

FIG. 9 Shows a side view of the base platform 45 as it relates to the wheels 20 which are mounted on the lower frame 18 of the ElectroWave device. The wheels roll up and down on the tract 41 as shown in FIG. 10. 44 are floats.

Figure 10:
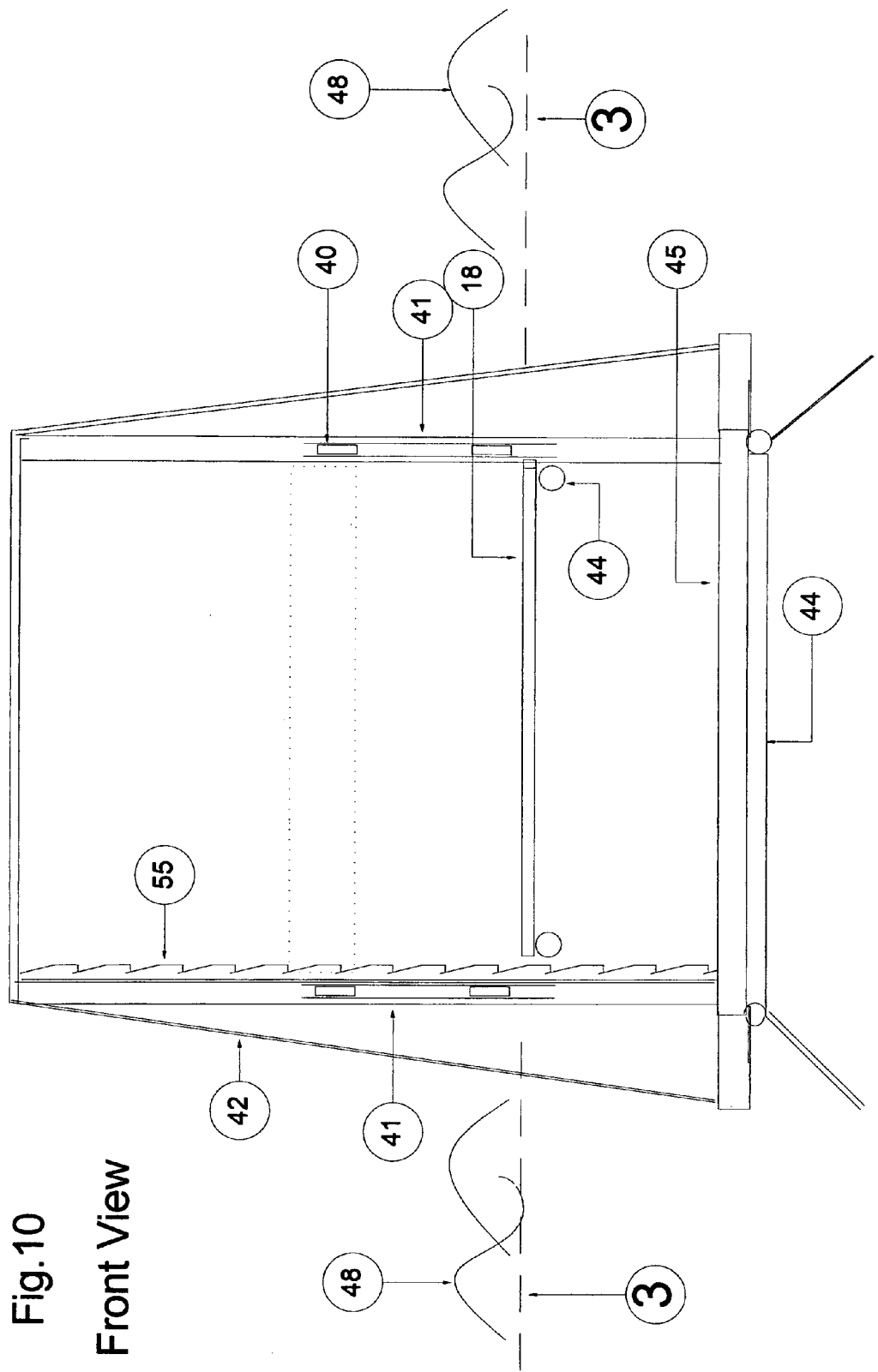
FIG. 10 shows a composite view of the base which supports the ElectroWave devise as described in FIGS. 8 & 9.
Figure 12:
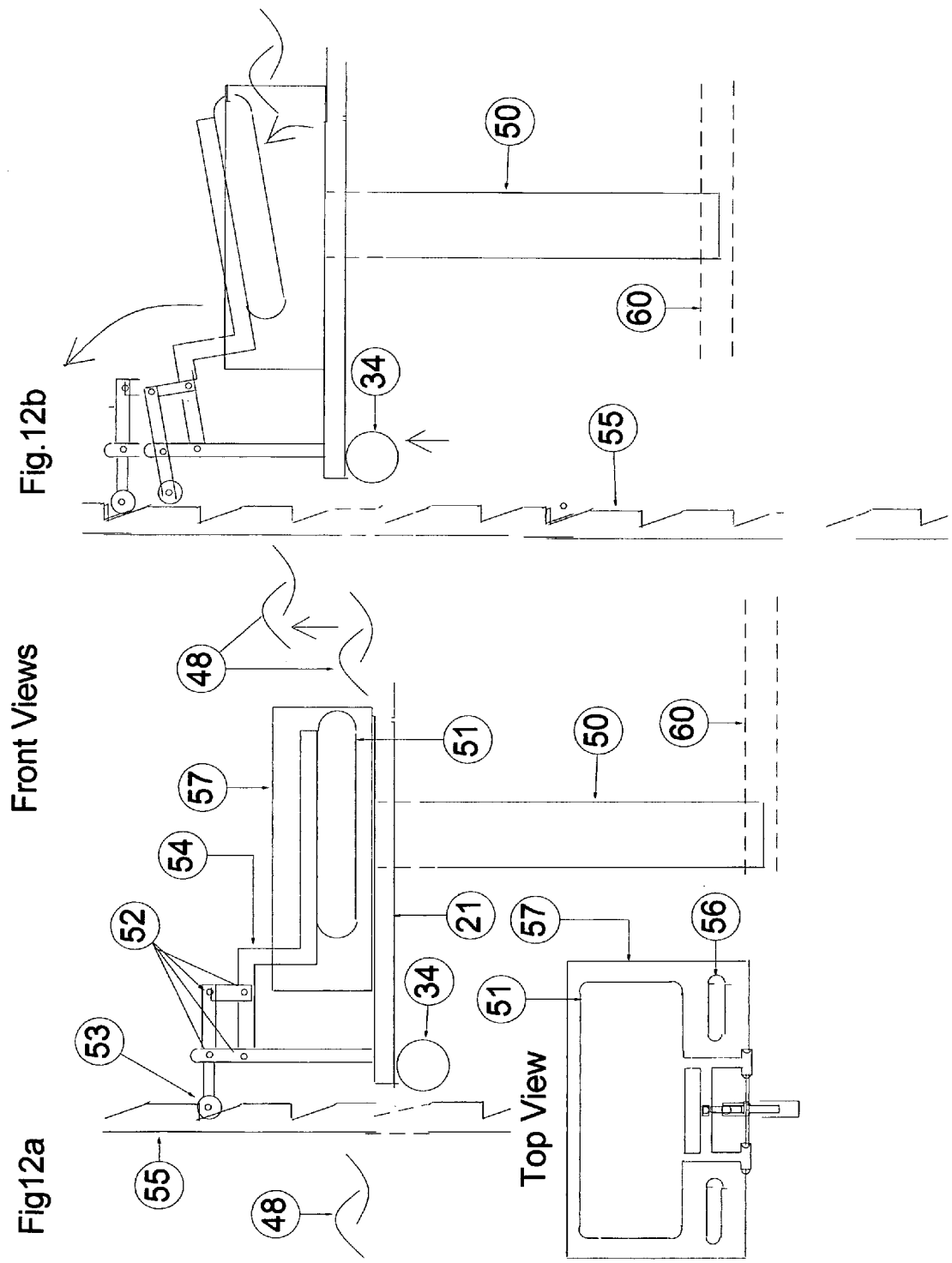
FIG. 12a shows the SurfaceFinder mechanism (57) which enables the ElectroWave device to accommodate the changing surface levels which are due to tides, surges & etc.
FIG. 12b shows the Surface Finder in the process of changing and locking into a different position to keep the Electro-Wave device in accord with the changing surface levels. It also shows a pipe (50) which extends at least down to the still water level.

FIG. 10 Is a front view of the side view shown in FIG. 9. A notched tract 55 which is located in between the double tract 41 which rises up from the base platform 45. The Surface Finder mechanism (shown in FIG. 12) locks into the notches on this tract to enable the ElectroWave device to rise up in increments so that the lower frame 18 stays on the same level as the surface 3 of the water. The locking in also prevents random upward movements that would be caused by the effect of waves 48 on the floats 44 located on the underside of the lower frame. Also shown are wheels 40 and cables 42.

Figure 11:
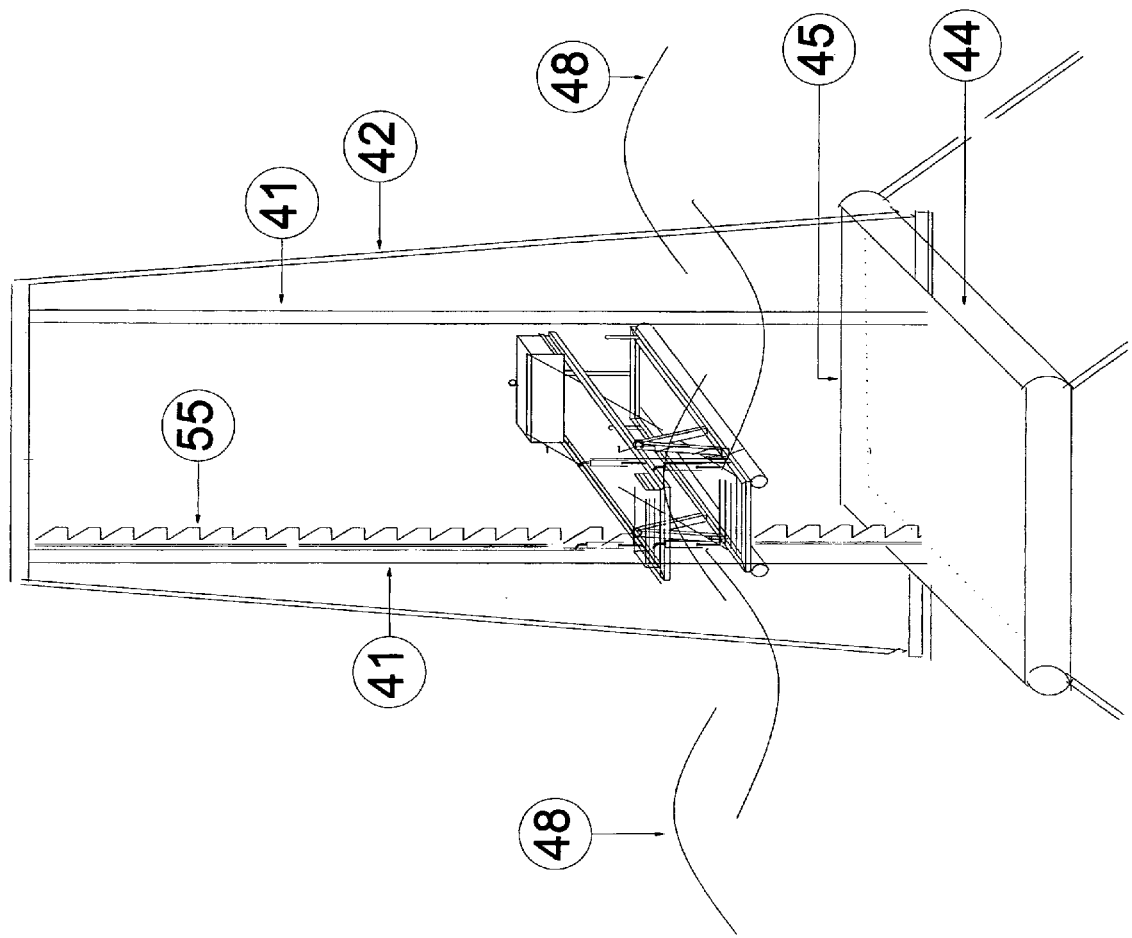
FIG. 11 shows a view which demonstrates the relationship between the device and its supporting structures.

FIG. 11 Shows a 3-D view for clarification of the relationship between the ElectroWave device 44 and the base 45 and tracts 55 & 41. Also shown are floats 44, waves 48 just above the surface, support 43 and cables 42

FIG. 12a Shows a Surface Finder in a locked position, see 53, while FIG. 12b shows the device having progressed to an unlocked position and onward into a relocked position. Both are a front view of the Surface Finder device.

FIG. 12a shows a notched tract 55, a wheel which has locked into a notch in the tract 53, joints 52, a kettle 57 which contains a float 51 that rises when the water level rises. When 51 rises it engages the mechanism which disengages the wheel 53 which enables the ElectroWave device to move up a notch so the lower frame 21 is once again at the same level as the surface of the water. Also there is a support rod 54, a float 34 and a wave 48. Also there is a pipe 50 which extends downward from the kettle down to at least the still water level 60. FIG. 12c shows a top view of the kettle 57 and its float. Holes 56 in the top of the kettle (if a top is present).

Figure 13:
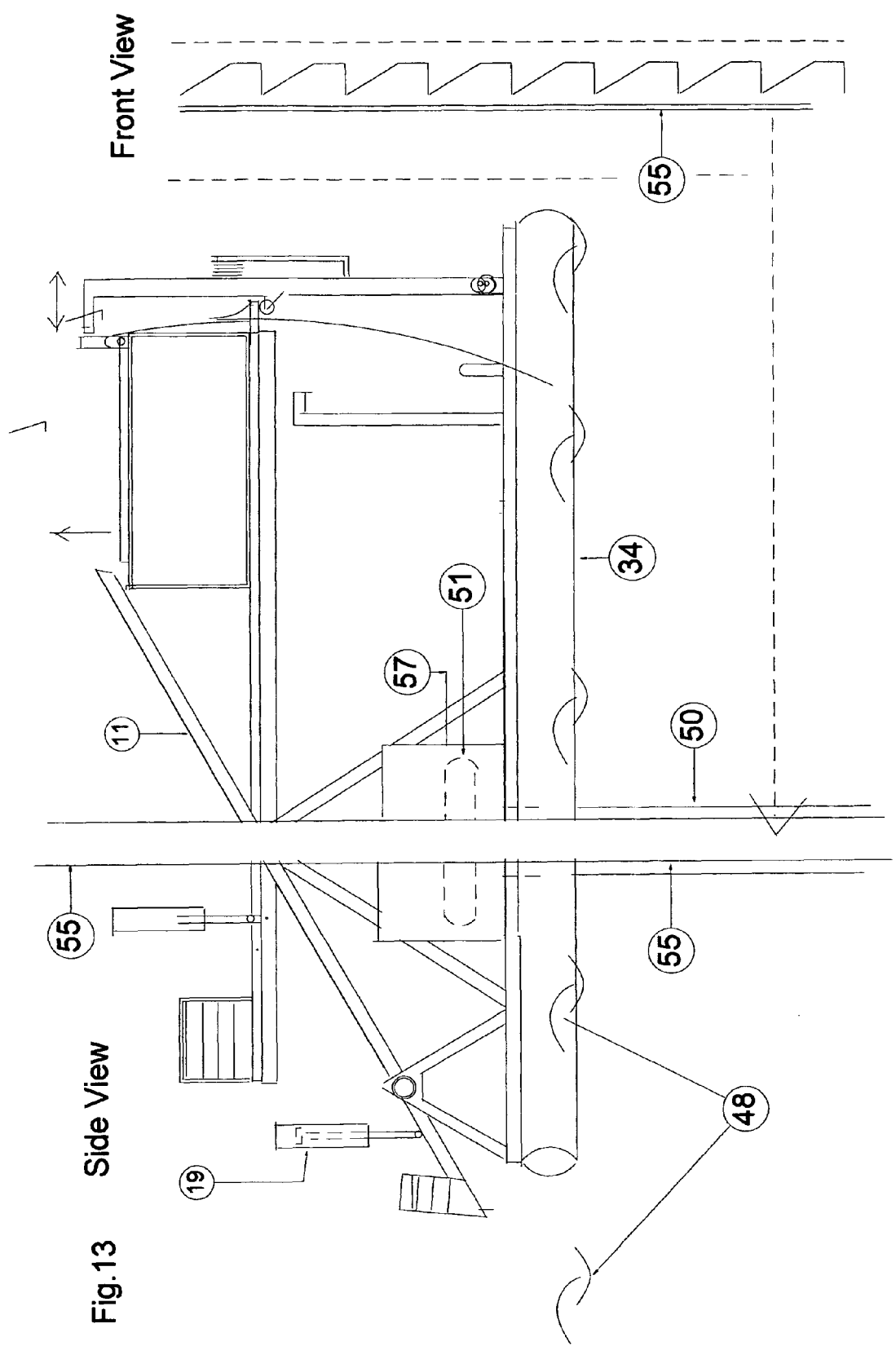
FIG. 13 shows the SurfaceFinder as it is positioned on the lower frame of the ElectroWave device.

FIG. 13a shows a side view of the ElectroWave device with the Surface Finder mechanism in place on the lower frame of the device. Shone are a kettle 57, a float 51, a pipe (that goes downward to the still water level).

FIG. 13b is a front view of the notched tract 55.

Figure 14:
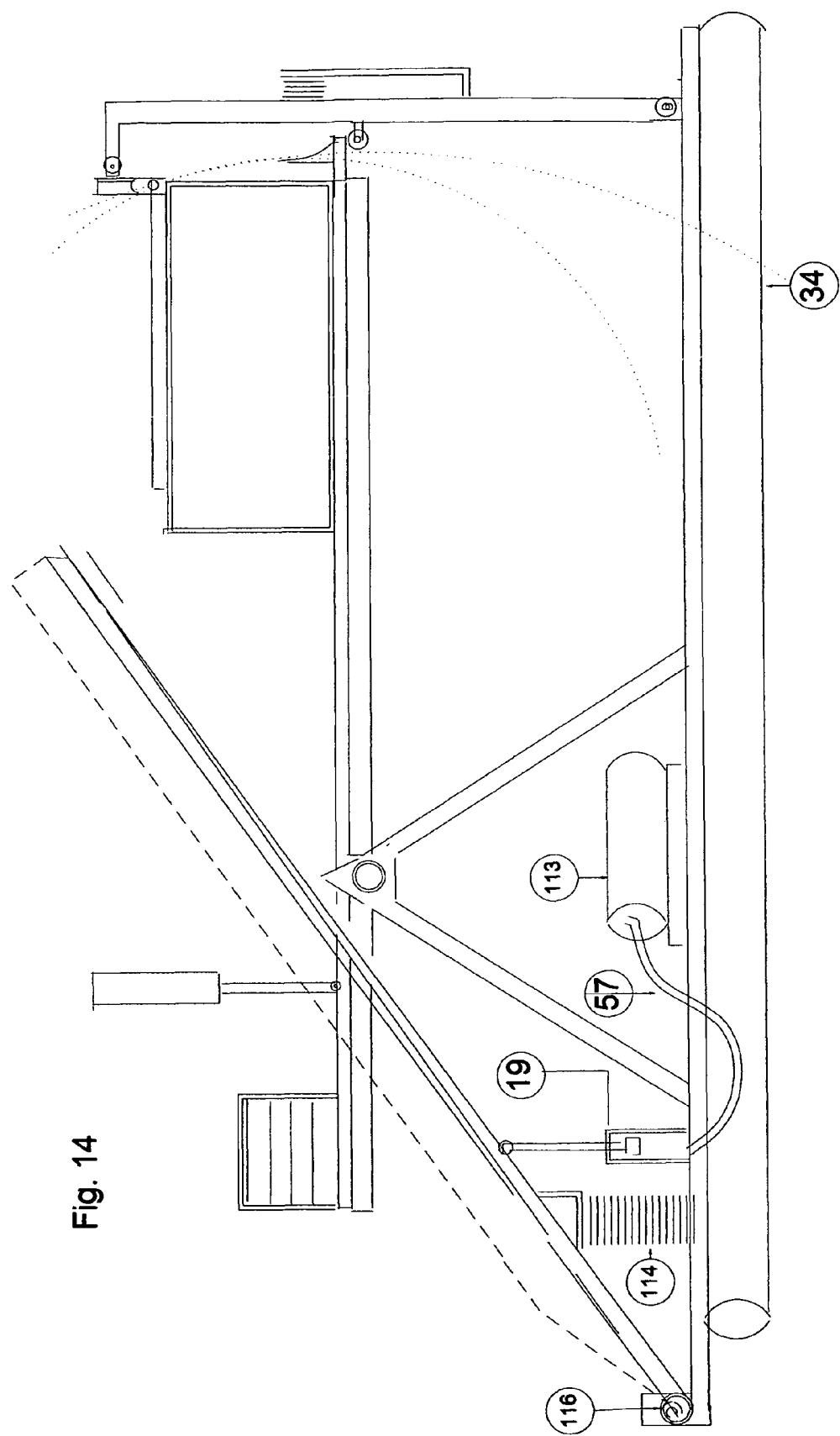
FIG. 14 A side view of the Power Ramp in the upper position ready to be pressed onto a downward stroke.
Figure 15:
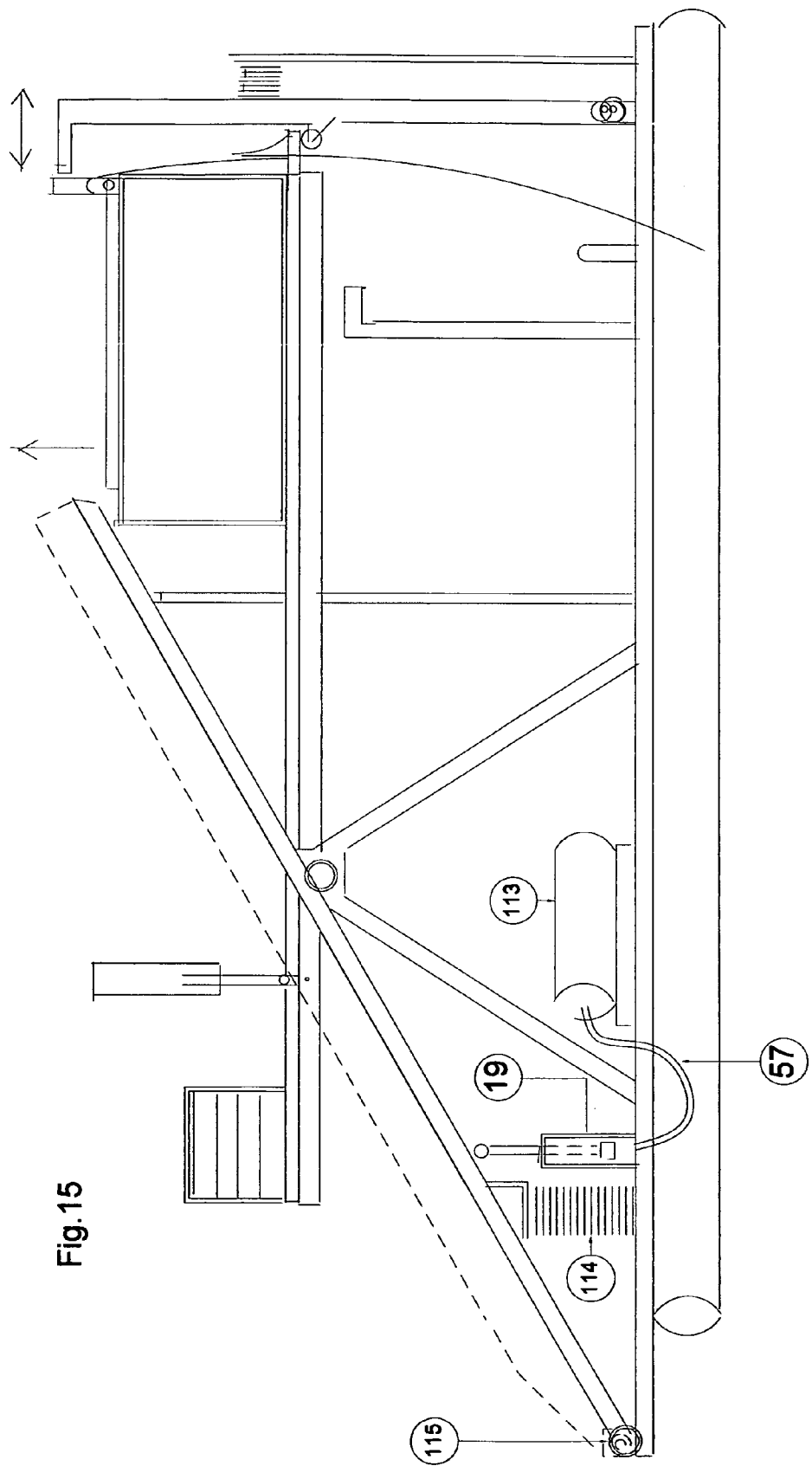
FIG. 15 A side view of the Power Ramp in the lower position having completed the stroke.

FIG. 14 116—A hinge with the lower leaf attached to the lower base and the upper leaf attached to the rear end of the ramp.

19—A compressed air cylinder which compresses the air and transfers it to auxiliary compressed air tank when the rod is depressed.

113—An auxiliary compressed air tank.

114—A spring which returns the ramp tp an uppermost position after it has been depressed.

57—A tubing through which the compressed air is transferred from the compressed air cylinder to the auxiliary compressed air tank.

118—A latch with mounted wheel which is locked into a notch on the notched tract.

119—A rod.

110—A compressed air valve.

117—An on off lever to turn compressed air valve on and off.

118—A float in a lower position

121—A receptacle that contains the input of water from the lower pipe which delivers water from the still water layer.

120—A pipe leading from the still water layer up to the receptacle.

112—A tubing.

I claim:

1. A machine which capitalizes on the descent of water, which has been elevated by making use of the random motion of waves and or the velocity of the waters, to produce useful energy, comprising:

a lower frame;
a fulcrum;
an upper frame;
a ramp or a Power Ramp;
a receptacle for holding water;
latch means for maintaining the receptacle in an uppermost position while the receptacle is being filled;
at least one lever for unlocking the latch means;
a first float, the first float rising as the receptacle is filled to capacity and, in the process, triggering the latch means to unlock, causing the receptacle to plunge downward;

an underwater platform;
a series of tracks mounted on said platform leading upward, mounted on the platform at a 90 degree angle;
a series of notched tracks mounted on said platform leading upward, mounted on the platform at a 90 degree angle;
a surface finding device;
a compressed air cylinder;
a compressed air motor; and
an electric generator.

2. The machine according to claim 1, wherein said lower frame serves as a base for said machine.

3. The machine according to claim 2, wherein the lower frame is constructed of materials such as plastics, fiberglass, water-proof paint and other materials that can best withstand the caustic effects of ocean waters.

4. The machine according to claim 1, wherein the fulcrum is mounted toward the posterior area of said lower frame.

5. The machine according to claim 4, wherein the fulcrum further comprises an axle joint located on the superior aspect of said fulcrum.

6. The machine according to claim 1, wherein the upper frame is mounted on an axle joint located on the superior aspect of the fulcrum, the fulcrum being mounted toward the posterior area of said lower frame.

7. The machine according to claim 1, wherein said receptacle is mounted on the anterior area of said upper frame.

8. The machine according to claim 1, which further comprises means for directing water from the wave surface upward to the receptacle.

9. The machine according to claim 8, wherein said ramp ushers water from the surface level to the receptacle.

10. The machine according to claim 8, wherein the receptacle retains deposited wave water.

11. The machine according to claim 1, wherein the first float is located in the posterior superior area of the receptacle.

12. A machine which capitalizes on the descent of water, which has been elevated by making use of the random motion of waves and or the velocity of the waters, to produce useful energy, comprising:
a lower frame;
a fulcrum;
an upper frame;
a ramp or a Power Ramp;
a receptacle fillable with water;
a first float located in the posterior superior area of the receptacle;
first latches which maintain the receptacle in its uppermost position while the receptacle is being filled;
levers for unlocking said first latches, the first float rising when the receptacle has been filled, causing depression of the levers to unlock the first latches, whereupon said receptacle plunges downward;
an underwater platform;
a series of tracks mounted on said platform leading upward, mounted on the platform at a 90 degree angle;
a series of notched tracks mounted on said platform leading upward, mounted on the platform at a 90 degree angle;
a surface finding device;
a compressed air cylinder;
a compressed air motor; and
an electric generator.

13. The machine according to claim 12, further comprising at least one rod mounted on the lower frame wherein the rod protrudes upward at a 90 degree angle; and second latches which secure at least one wall of said receptacle, the rod, upon coming into contact with the second latches, unlocking them, thereby causing the water to be released from the receptacle.

14. A machine which capitalizes on the descent of water, which has been elevated by making use of the random motion of waves and or the velocity of the waters, to produce useful energy, comprising:
a lower frame;
a fulcrum;
an upper frame;
a ramp or a Power Ramp;
a receptacle fillable with water;
latches which secure at least one wall of the receptacle;
at least one rod mounted on the lower frame wherein the rod protrudes upward at a 90 degree angle, the rod, upon coming into contact with the latches, unlocking them, causing the water to be released from the receptacle;
an underwater platform;
a series of tracks mounted on said platform leading upward, mounted on the platform at a 90 degree angle;
a series of notched tracks mounted on said platform leading upward, mounted on the platform at a 90 degree angle;
a surface finding device;
a compressed air cylinder;
a compressed air motor; and
an electric generator.

15. The machine according to claim 14, further comprising a counterweight or a series of counterweights which are located on the rear end of the upper frame, opposite the receptacle, wherein the descent of the counterweights causes the elevation of the receptacle after it has emptied, returning it to an upper position, wherein it is ready to repeat the cycle.

16. The machine according to claim 14, further comprising a series of anchoring objects which are anchored to ocean, or lake, floor.

17. The machine according to claim 16, further comprising a series of cables connecting said platform to said anchoring objects wherein the platform is stabilized.

18. The machine according to claim 17, further comprising a series of floats wherein the platform is floated toward the surface.

19. The machine according to claim 18, wherein said platform is placed at a level some distance below the level of the lowest ebb tide.

20. The machine according to claim 14, wherein said lower frame rolls upward and downward on said series of tracks.

21. The machine according to claim 14, wherein the lower frame includes a series of wheels on which the lower frame rolls on said tracks.

22. The machine according to claim 14, wherein the notched tracks prevent random upward movements of the lower frame when said surface finding device locks into the individual notches.

23. The machine according to claim 14, further comprising a series of floats which are mounted on the underside of the lower frame so that it can be maintained above the surface levels.

24. A machine which capitalizes on the descent of water, which has been elevated by making use of the random motion of waves and/or the velocity of the waters, to produce useful energy, comprising:
a lower frame;
a fulcrum;
an upper frame;
a Power Ramp including a ramp up which the current, when it has sufficient velocity, can climb;
a hinge joint;
a spring;
a compressed air cylinder; and
an auxiliary compressed air tank;

a receptacle;

an underwater platform;

a series of tracks mounted on said platform leading upward, mounted on the platform at a 90 degree angle;

a series of notched tracks mounted on said platform leading upward, mounted on the platform at a 90 degree angle;

a surface finding device;

a main compressed air tank;

a compressed air motor; and an electric generator.

25. The machine according to claim 24, further comprising a pair of spaced apart, longitudinally extending side walls, the side walls being mounted on the sides of the ramp, each side wall being disposed at a 90 degree angle or less thereto.

26. The machine according to claim 25, wherein the ramp channels water from the surface level upward to and over the top of said ramp.

27. The machine according to claim 24, wherein the hinge joint comprises a two leaf hinge, the first leaf of the hinge being mounted on the posterior end of said lower frame and the second leaf of the hinge being mounted on the posterior end of the Power Ramp.

28. The machine according to claim 24, wherein the spring is mounted between the posterior areas of said lower frame and the Power Ramp.

29. The machine according to claim 24, wherein the compressed air cylinder is mounted between the anterior areas of said upper frame and said Power Ramp.

30. The machine according to claim 24, wherein the auxiliary compressed air tank receives the compressed air which has been generated by the Power Ramp via the compressed air cylinder, and wherein compressed air may also be received from the main compressed air tank.

* * * * *